Figure 1:
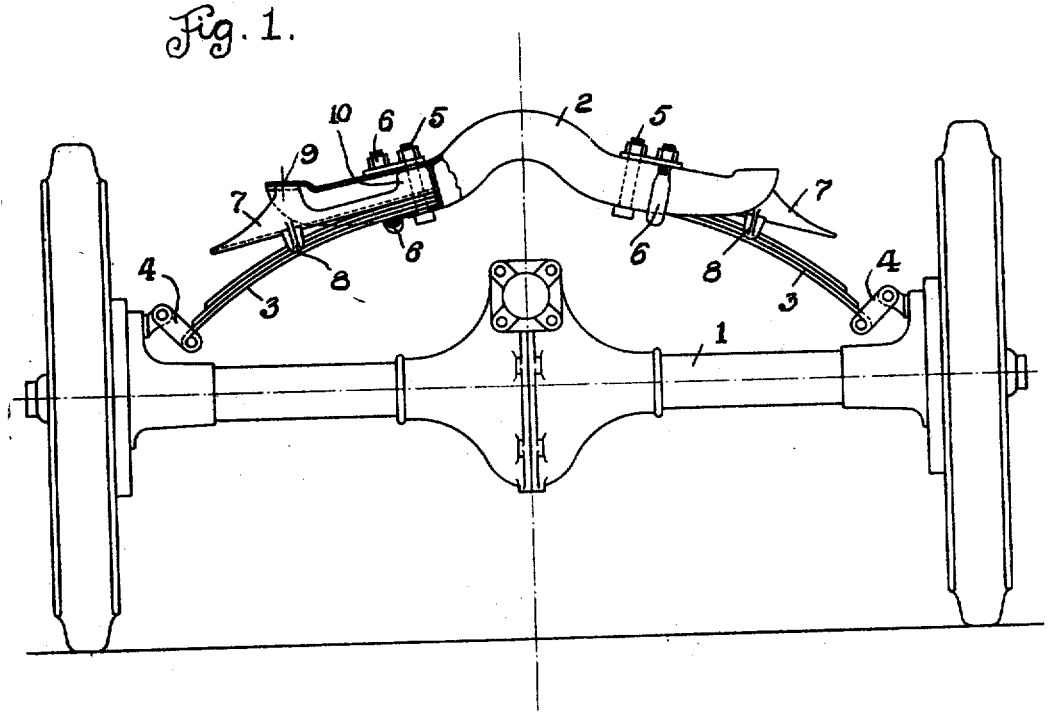

N. L. OLSON.
AUTOMATIC TENSION REGULATOR FOR VEHICLE SPRINGS.
APPLICATION FILED APR. 19, 1919.

1,380,409.

Patented June 7, 1921.

WITNESS:
Karl H. Butler
Anna M. Dorr.

INVENTOR.
NELS L. OLSON.
BY
ATTORNEYS

UNITED STATES PATENT OFFICE.

NELS L. OLSON, OF HIGHLAND PARK, MICHIGAN.

AUTOMATIC TENSION-REGULATOR FOR VEHICLE-SPRINGS.

1,380,409.  Specification of Letters Patent.  Patented June 7, 1921.

Application filed April 19, 1919. Serial No. 291,229.

*To all whom it may concern:*

Be it known that I, NELS L. OLSON, a citizen of the United States of America, residing at Highland Park, in the county of Wayne and State of Michigan, have invented certain new and useful Improvements in Automatic Tension-Regulators for Vehicle-Springs, of which the following is a specification, reference being had therein to the accompanying drawings.

The spring suspension of a motor vehicle, and especially a motor truck, must be designed to fulfil two requirements: First, it must be heavy enough to give an empty vehicle the necessary easy riding qualities, and second, it must be stiff enough to support a minimum load without undue deflection of the spring. These two requirements or conditions are evidently in direct opposition to one another, and in practice the designer must hit upon a compromise and provide a spring that will function in both instances. The suspension is ordinarily designed to take care of ordinary loads and an occasional overload, with the result that when the vehicle is empty the springs have not the necessary resiliency and the truck rides hard. This is not only uncomfortable for the driver, but if solid tires are used, it has a very destructive effect on the body and the mechanism of the truck.

The primary object of this invention is to provide means for regulating the stiffness of the springs according to the load, and furthermore to produce such regulation automatically without any adjustment.

Another object of my invention is to combine a light duty spring, capable of flexure throughout its length, with a load carrying member that automatically decreases the flexure length of the spring in proportion to the load on said spring, and this conversion of a light duty spring into a heavy duty spring is attained without material change or modification, in the present type of motor truck.

A further object of my invention is to obtain the above and other results by a durable mechanical construction that will be hereinafter considered and then claimed, and reference will now be had to the drawing wherein—

Figure 2:
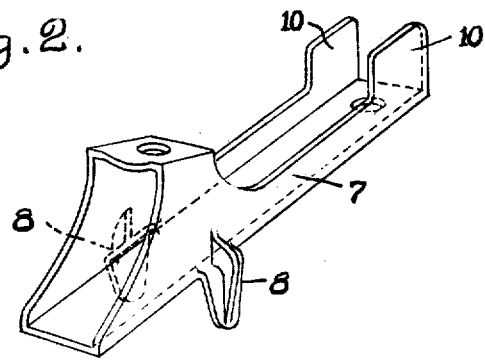

Figure 1 is a rear view of a standard motor vehicle, showing the rear axle housing and a load carrying member yieldably held above the rear axle housing, and Fig. 2 is a perspective view of an interposed shoe or seat member adapted to form part of the spring suspension.

In the drawing, the reference numeral 1 denotes a rear axle housing of a motor truck or similar vehicle and connected to said housing by shackles 4 are the outer ends of cantaliver springs 3, which have the inner ends thereof mounted in a load carrying member 2 by fastening devices 5 and 6.

The cantaliver springs 3 are preferably of the leaf or laminated type, which in the present instance are composed of three leaves or laminations in contradistinction to the eight or more leaves which compose an ordinary spring for sustaining the rear end of a one ton truck body relative to the rear axle of the truck. The load carrying member 2 represents the rear cross member of a truck chassis or vehicle body and said load carrying member ordinarily has its ends apertured, as at 9, so that the rear end of the chassis or body may be conveniently connected thereto.

The fastening means 5 is in the form of the bolt and nut with the bolt extending through the inner ends of the cantaliver spring, and the fastening means 6 is preferably in the form of clips which embrace the load carrying member 2 and prevent lateral displacement of the inner ends of the springs relative to the load carrying member.

The reference numeral 7 denotes an interposed seat or shoe member in the outer end of the load carrying member 2, and each member is channel shaped for the greater part of its length and rectangular in cross section intermediate its ends. This shape of each member is best brought out in Fig. 2, and by reference to the left hand side of Fig. 1, it will be noted that the side flanges 10 at the inner end of the seat or shoe member engage the upper wall of the load carrying member 2, and with this inner end of the shoe member apertured, the fastening means 5 may extend therethrough. The portion of the shoe member which is rectangular in cross section engages under the outer end of the load carrying member 2 and may be connected thereto by the same fastening means which passes through the aperture 9 to hold a chassis or body relative to the load carrying member. At this portion of the shoe member there are side ears or lugs 8 that extend downwardly at the sides of the cantaliver springs and cooperate with the side walls of the load-carrying member 2 in preventing lateral displacement of the outer end of the shoe member relative to the spring beneath said member.

In an ordinary spring suspension, the springs being figured in the usual way for a maximum load, there are at least ten leaves that are necessarily very stiff when no load is on a truck. In my construction the majority of these leaves are discarded and only a few of the long ones employed. The space between these long leaves and the top of the load carrying member 2 is filled by the seat or shoe member 7 and the lower face of each shoe member is such that when no load is carried the springs rest on the shoe members for only a very short length, as shown in Fig. 1. In consequence of this spring arrangement a large flexibility is obtained, since the length of the springs provides a maximum leverage, but as the load is increased, the springs gradually flatten out and so increase their length of contact with the shoe members and this is equivalent to shortening the leaves of the spring which increases the rigidity thereof, since the springs can only flex at their free ends which are not in contact with the shoe members. It is therefore possible for the length of each cantaliver spring to automatically adjust itself to the load supported by the member 2, the greatest resiliency being offered when the load is light and the greatest stiffness produced when the maximum load is carried.

The lower face of each shoe member is made either straight or curved, according to the vehicle to which it is applied and the length is such that the spring comes in full contact with the shoe member only when the maximum load is carried. These shoe members may be made of wood or preferably of steel cast or stamped and their shape contributes to an easy installation particularly when a heavy duty spring is to be converted into a light duty spring.

It is possible to make the load carrying member 2, the shoe members 7 and the cantaliver springs 3, an assembled unit so that the unit may be quickly substituted for the present suspension of a well known one ton truck now in use, and from the viewpoint of a driver who is directly affected by the riding qualities of a truck, also of the owner through reduced repair bills due to the decrease of vibrations to which the mechanism is subjected, it is believed that these and other advantages will be apparent without further description.

While in the drawing there is illustrated a preferred embodiment of my invention, it is to be understood that the structural elements are susceptible to such variations and modifications as fall within the scope of the appended claims.

What I claim is:—

1. The combination with a rear axle housing, and a channel shaped load carrying member above said housing, of cantaliver springs having the inner ends thereof extending into said channel shaped load carrying member and attached to said load carrying member, and the outer ends thereof connected to said rear axle housing, and shoe members having inner channel ends interposed between said springs and said load carrying member and connected thereto and adapted to add rigidity to said springs as the ends of said load carrying member move toward said springs, said shoe members being rectangular in cross section intermediate the ends thereof to fit in the outer ends of said channel shaped load carrying member.

2. The combination with a rear axle housing, and a channel load carrying member above said housing, of cantaliver springs having the inner ends thereof in said channel load carrying member, and the outer ends thereof connected to said rear axle housing, fastening means for the inner ends of said springs, and shoe members having the inner ends thereof interposed between the inner ends of said springs and said load carrying member and the outer ends thereof extending at an angle to said springs and adapted to contact therewith and decrease the flexure length of said springs, said shoe members having the inner ends thereof channel shaped and held by the fastening means at the inner ends of said springs.

In testimony whereof I affix my signature in the presence of two witnesses.

NELS L. OLSON.

Witnesses:
 KARL H. BUTLER,
 ANNA M. DORR.